(12) United States Patent
Sawada et al.

(10) Patent No.: US 9,840,179 B2
(45) Date of Patent: Dec. 12, 2017

(54) LIFTABLE CONTAINER HOLDER

(71) Applicant: TOYODA GOSEI CO., LTD., Kiyosu-shi, Aichi-ken (JP)

(72) Inventors: Shinichi Sawada, Kiyosu (JP); Kunihito Kondo, Nisshin (JP); Yoshinori Masatsugu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 72 days.

(21) Appl. No.: 14/869,518

(22) Filed: Sep. 29, 2015

(65) Prior Publication Data

US 2016/0106246 A1  Apr. 21, 2016

(30) Foreign Application Priority Data

Oct. 16, 2014 (JP) ................................ 2014-211749
Mar. 20, 2015 (JP) ................................ 2015-057489

(51) Int. Cl.
*B65D 25/00* (2006.01)
*B60N 3/10* (2006.01)
*A47G 23/02* (2006.01)

(52) U.S. Cl.
CPC ............... *B60N 3/10* (2013.01); *B60N 3/106* (2013.01)

(58) Field of Classification Search
CPC .......... B60N 3/10; B60N 3/102; B60N 3/105; B60N 3/106; A47G 23/0216

USPC .......................................................... 220/737
See application file for complete search history.

(56) References Cited

U.S. PATENT DOCUMENTS

2013/0038097 A1* 2/2013 Oldani ................... B60N 3/105
297/188.14

FOREIGN PATENT DOCUMENTS

JP  2007-196884 A  8/2007

* cited by examiner

*Primary Examiner* — Andrew T Kirsch
(74) *Attorney, Agent, or Firm* — Posz Law Group, PLC

(57) ABSTRACT

A liftable container holder of the present invention includes a case part that defines a receiving space therein and has an opening of the receiving space, an outer cylinder part that is disposed in the receiving space and reciprocatingly movable through the opening in an outward direction of the receiving space, an inner cylinder part that is disposed in the receiving space and reciprocatingly movable through the opening in an inward direction of the receiving space, and a lifting part that displaces the inner cylinder part and the outer cylinder part in directions different from each other. The lifting part has a link member including a one-end part connected to the outer cylinder part, an other-end part connected to the inner cylinder part, and a rotating support part rotatably supported in the case part between the one-end part and the other-end part.

21 Claims, 14 Drawing Sheets

LIFTABLE CONTAINER HOLDER

BACKGROUND

1. Technical Field

The present invention relates to a container holder for holding a container.

2. Related Art

There are beverage containers of various shapes, such as a tall container and a short container. Examples of the tall container include a plastic-bottle type container, a large-diameter paper cup, and the like. Examples of the short container include a can-type container and a small paper cup. As needed, a tall container will be called a large container, and a short container will be called a small container, hereinafter.

A commonly-used container holder has a case part with a receiving space. The receiving space is normally defined by a side wall and a bottom wall of the case part, and is capable of receiving a container. A bottom surface of the container received in the receiving space can be supported by the bottom wall of the case part. A side surface of the container can be supported by the side wall of the case part.

When a large container is placed in a shallow receiving space adapted to receive a small container, only a lower part of the large container is received in the receiving space, and an upper part thereof is largely exposed upward to the outside of the container holder. For this reason, in such a case, the large container is disadvantageously difficult to be stably supported by the container holder. On the other hand, when a small container is placed in a deep receiving space adapted to receive a large container, the small container is fitted in a lower part (i.e., deep side) of the receiving space and is disadvantageously difficult to be removed from the receiving space.

With respect to this problem, in recent years, there has been proposed a technique that changes a bottom wall supporting the bottom surface of a container in depth to make the substantial depth of the receiving space variable. For example, JP 2007-196884 A describes a container holding device (container holder) including a fixed peripheral wall part and a movable bottom wall part which format least part of a container receiving space, and a position adjusting mechanism which holds the movable bottom wall part in a horizontal attitude and can adjust a vertical position of the movable bottom wall part.

However, the container holder (container holding device) described in JP 2007-196884 A disadvantageously requires a space in a direction of depth. More specifically, in order to form a receiving space adaptable to a large container, a length from an opening to a bottom wall in a receiving space of a case part is required to be large, and the case part is required to have a large size. However, in a recent vehicle, the designability of the exterior and interior of the vehicle is required to be improved, and a container holder in the interior is required to have a small required space. In particular, the length of the container holder in the direction of depth is required to be short.

In a conventional container holder (container holding device), the opening of the receiving space is exposed. This arrangement disadvantageously spoils the designability.

SUMMARY

The present invention has been made in consideration of the above circumstances and an object thereof is to provide a container holder having a small frame in the direction of depth.

In order to solve the problems, the present inventors made studies on the configuration of a container holder having a liftable bottom wall and made the invention.

A liftable container holder according to the present invention includes:

a case part that defines a receiving space therein and has an opening of a receiving space;

an outer cylinder part that is disposed in the receiving space and reciprocatingly movable through the opening in an outward direction of the receiving space;

an inner cylinder part that is disposed in the receiving space and reciprocatingly movable through the opening in an inward direction of the receiving space; and a lifting part that displaces the inner cylinder part and the outer cylinder part in directions different from each other, wherein the lifting part has a link member including a one-end part connected to the outer cylinder part, an other-end part connected to the inner cylinder part, and a rotating support part rotatably supported in the case part between the one-end part and the other-end part.

In a container holder according to the present invention, an inner cylinder and an outer cylinder are displaced in opposite directions to change a depth (depth of the internal and outer cylinders in a displacement direction) of a receiving space in which a container is received. With this change, the receiving space having a predetermined depth can be formed. More specifically, the receiving space extending from a case part having an opening can be formed. That is, the container holder according to the present invention is a container holder having a small frame in the direction of depth.

Displacements of the inner cylinder and the outer cylinder are simultaneously performed by the link member of the lifting part. More specifically, the inner and outer cylinders can be simultaneously displaced with a simple configuration.

DETAILED DESCRIPTION

Embodiments embodying a container holder according to the present invention with a cup holder will be concretely described below with reference to the accompanying drawings.

First Embodiment

A cup holder 1 according to the first embodiment is a drink holder disposed on a console box of a vehicle. Configurations of the cup holder 1 are shown in FIGS. 1 to 4.

Figure 1:
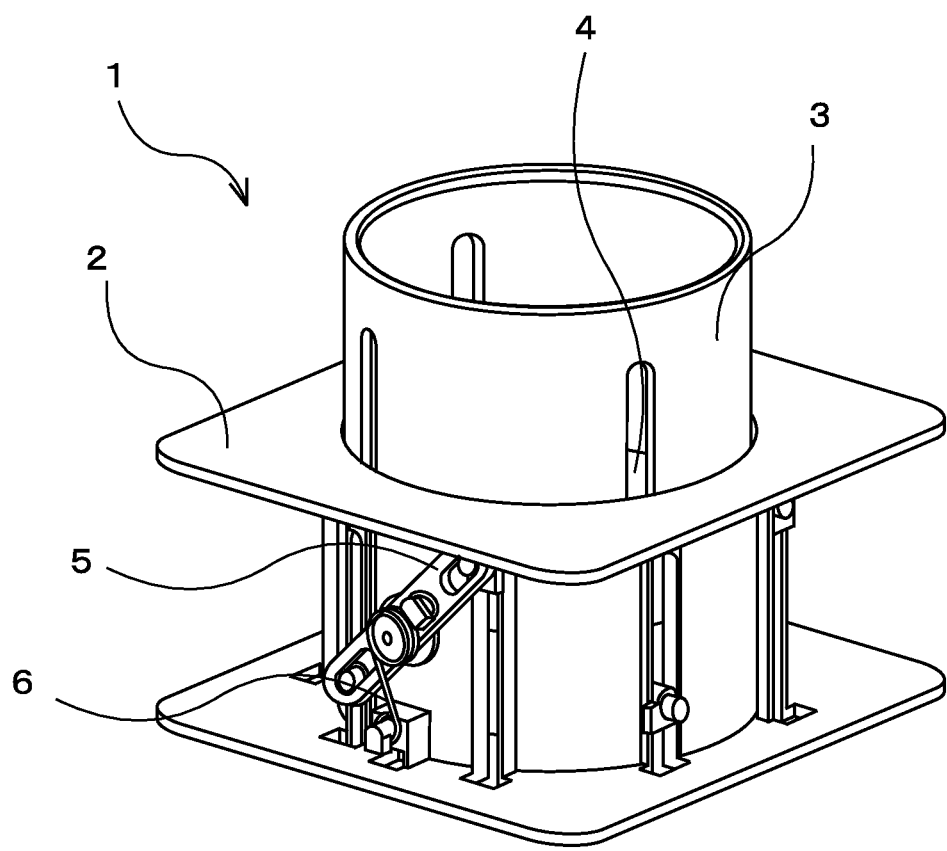
FIG. 1 is a perspective view of a use state of a cup holder according to a first embodiment.

As shown in FIG. 1, the cup holder 1 has a body part 2, an outer cylinder 3, an inner cylinder 4, a link 5, and a spring member 6.

(Body Part)

Figure 2:
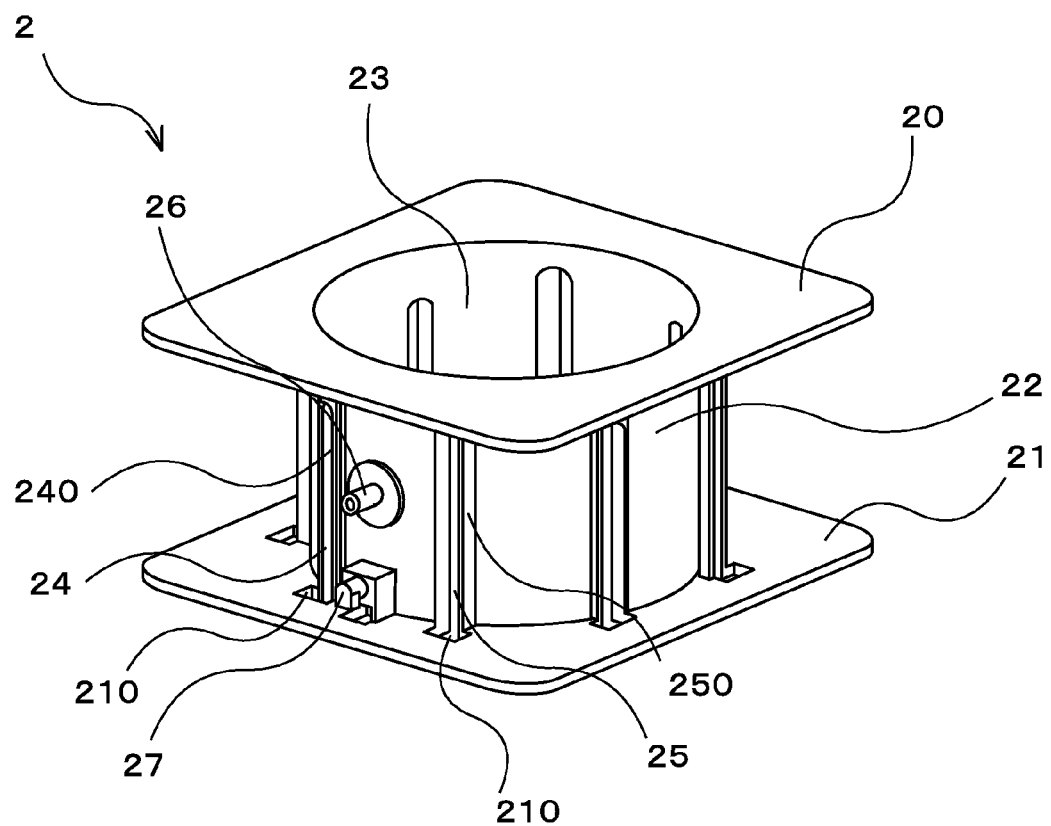
FIG. 2 is a perspective view of a body part of the cup holder according to the first embodiment.

The body part 2, as shown in FIG. 2, an upper surface part 20, a lower surface part 21, and a cylinder part 22. The cylinder part 22 corresponds to the case part in claims, defines a receiving space therein, and has an opening which defines a communication hole for causing the receiving space and the outside to communicate with each other.

The upper surface part 20 is a plate-like member forming an upper surface of the cup holder 1. The upper surface part 20 has an opening 23 to which a one-end part (upper end in the figure) of the cylinder part 22 is connected and which communicates with a space of an axial center part of the cylinder part 22.

The cylinder part 22 is a cylindrical member which defines the receiving space in the cup holder 1. The receiving space is a space which partially forms a space in which the outer cylinder 3 and the inner cylinder 4 are stored and in which a cup (drink) is placed. The cylinder part 22 has a one-end part connected to the upper surface part 20 and the other-end part (lower end in the figure) connected to the lower surface part 21. A cylindrical member forming the cylinder part 22 need only have a shape capable of providing the receiving space, and may be a cylindrical-shaped member as shown in the figure or a square-shaped member.

The cylinder part 22 has cut-away sections 24 and 25 extending from the other-end part (lower end) toward the one-end part. The cut-away section 24 is mounted such that an outer cylinder latching projection 32 of the outer cylinder 3 penetrates the cut-away section 24, and the cut-away section 25 is mounted such that an inner cylinder latching projection 42 of the inner cylinder 4 penetrates the cut-away section 25. A circumference part of the cylinder part 22 in which the cut-away sections 24 and 25 are formed has a flange parts 240 and 250 protruding and extending from an outer circumferential surface of the circumference part.

The flange parts 240 and 250 protrude toward a plane in which the link 5 extends when the cup holder 1 is assembled.

The cylinder part 22 has a link support projection 26 which supports the link 5 and the spring member 6 on the outer circumferential surface of the cylinder part 22. The link support projection 26 is a rod-like (columnar) projection protruding from the outer circumferential surface of the cylinder part 22.

The cylinder part 22 has a spring latching projection 27 on which one end of the spring member 6 is latched at the other-end part (lower end) of the cylinder part 22. The spring latching projection 27 is disposed at the same radial position (position in the radial direction of the cylindrical cylinder part 22) as that of the link support projection 26. A position of the spring latching projection 27 in an axial direction corresponds to the other-end part side (lower end side) of the link support projection 26.

The lower surface part 21 is a plate-like member forming a lower surface of the cup holder 1. The other-end part of the cylinder part 22 is connected to the lower surface part 21, and the lower surface part 21 has an opening communicating with the space of the axial center part of the cylinder part 22. The lower surface part 21 has cut-out parts 210 through which the latching projections 32 and 42 can pass at positions corresponding to the end parts of the cut-away sections 24 and 25 of the cylinder part 22.

(Outer Cylinder)

The outer cylinder 3 is a member that corresponds to the outer cylinder part in claims, is disposed in the receiving space, and can be reciprocatingly moved through the opening in an outward direction of the receiving space.

Figure 3:
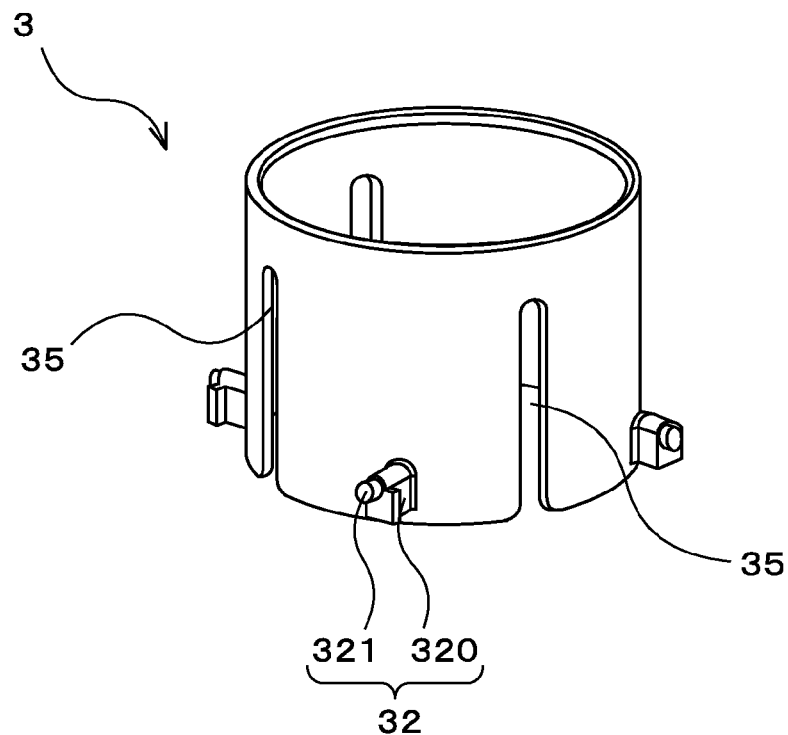
FIG. 3 is a perspective view of an outer cylinder of the cup holder according to the first embodiment.

The outer cylinder 3 is, as shown in FIG. 3, a member having a cylindrical shape (cylindrical member) configured to be stored in the receiving space of the body part 2. The outer cylinder 3 has a cylindrical shape having an outer circumferential shape substantially matched with the shape of a hollow portion at the axial center of the cylinder part 22. The length of the outer cylinder 3 in the axial direction need only be a length at which the outer cylinder 3 can be stored in the receiving space. The longer the length is, the better the outer cylinder 3 becomes. The length of the outer cylinder 3 is preferably equal to the length of the cylinder part 22.

The outer cylinder 3 has a cut-away section 35 extending from the other-end part (lower end) toward the one-end part. The cut-away section 35 is formed at a position (and shape) overlapping the cut-away section 25 of the body part 2 when the outer cylinder 3 forms the cup holder 1. The cut-away section 35 is mounted such that the inner cylinder latching projection 42 of the inner cylinder 4 penetrates the cut-away section 35.

The outer cylinder 3 has the outer cylinder latching projection 32 on the outer circumferential surface thereof. The outer cylinder latching projection 32 is a projection protruding from the outer circumferential surface of the outer cylinder 3, is inserted into the cut-away section 24 of the cylinder part 22, and has an outer cylinder latching projection body part 320 and a columnar outer cylinder support part 321 protruding from a distal end face of the outer cylinder latching projection body part 320 in order to guide the outer cylinder 3 along the cut-away section 24 and the flange part 240. The outer cylinder latching projection 32 is disposed at the other-end part (lower end) of the outer cylinder 3 so as to protrude at the other-end part (lower end) of the cylinder part 22 when the cup holder 1 is formed.

(Inner Cylinder)

The inner cylinder 4 is a member that corresponds to the inner cylinder part in claims, is disposed in the receiving space, and can be reciprocatingly moved through the opening in an inward direction of the receiving space. The inner cylinder 4 is, as shown in FIG. 1, a member configured to be stored in the receiving space of the body part 2 and a hollow axial center part of the outer cylinder 3.

Figure 4:
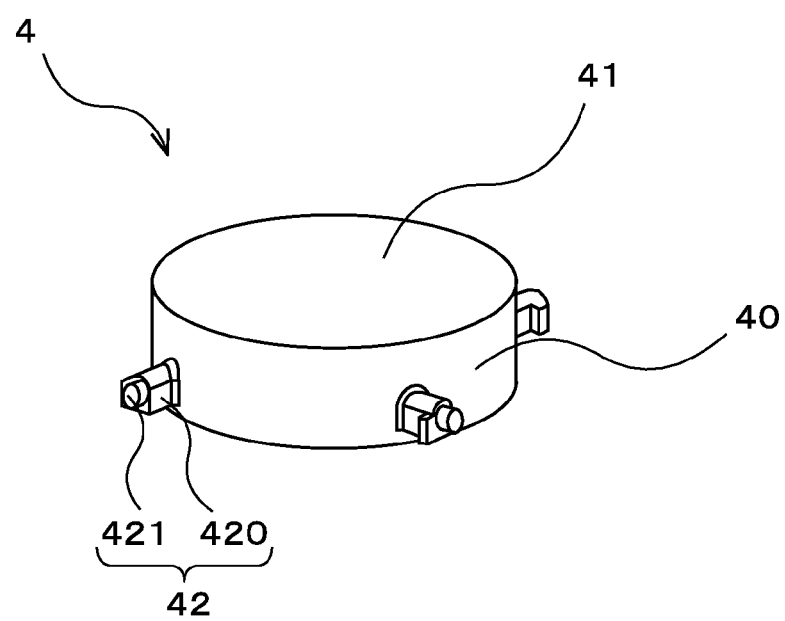
FIG. 4 is a perspective view of an inner cylinder of the cup holder according to the first embodiment.

The inner cylinder 4, as shown in FIG. 4, has a cylindrical inner cylinder body part 40 having an outer circumferential shape substantially matched with the shape of the hollow portion at the axial center of the outer cylinder 3, an upper surface plate 41 formed by closing a one-end part (upper end) of the inner cylinder body part 40, and the inner cylinder latching projection 42 formed on an outer circumferential surface of the inner cylinder body part 40.

The upper surface plate 41 of the inner cylinder 4 forms a designed surface (functioning as a lid member) on the upper surface of the cup holder 1, and functions as a bottom wall which holds (supports) the bottom surface of a cup (drink) when the cup holder 1 holds the cup (drink).

The inner cylinder latching projection 42 of the inner cylinder 4 is a projection protruding from the outer circumferential surface of the inner cylinder body part 40 of the inner cylinder 4, is inserted into the cut-away section 25 of the cylinder part 22 and the cut-away section 35 of the outer cylinder 3, and has an inner cylinder latching projection body part 420 and a columnar inner cylinder support part 421 protruding from a distal end face of the inner cylinder latching projection body part 420 in order to guide the inner cylinder 4 along the cut-away sections 25 and 35 and the flange part 250.

The inner cylinder latching projection 42 (inner cylinder support part 421) corresponds to the projection in claims having a distal end inserted into a recessed part.

The length of the inner cylinder 4 in the axial direction need only be a length at which the inner cylinder 4 can be stored in the receiving space. The shorter the length is, the better the inner cylinder 4 becomes. The length of the inner cylinder 4 in the axial direction corresponds to the lengths of the upper surface plate 41 and the inner cylinder latching projection 42, and is determined by the length of the cut-away section 25 of the cylinder part 22 and the cut-away section 35 of the outer cylinder 3. More specifically, as the lengths of the cut-away sections 25 and 35 are long, the lengths of the upper surface plate 41 and the inner cylinder latching projection 42 can be shortened.

(Link)

The link 5 corresponds to the link member (lifting part) in claims and displaces the inner cylinder part and the outer cylinder part in directions different from each other.

Figure 5:
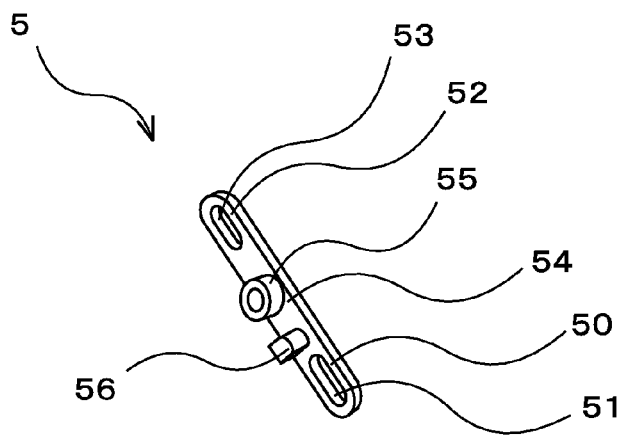
FIG. 5 is a perspective view of a link of the cup holder according to the first embodiment.

The link 5 is, as shown in FIG. 5, a plate-like member. The link 5 includes a one-end part 50 connected to the outer cylinder 3, an other-end part 52 connected to the inner cylinder 4, and a rotating support part 54 rotatably supported in the case part between the one-end part 50 and the other-end part 52.

In the one-end part 50, a through hole 51 into which the outer cylinder latching projection 32 of the outer cylinder 3 is inserted is formed. The through hole 51 substantially forms a chamfer extending along the longitudinal direction of the link 5. The through hole 51 is formed such that the inserted outer cylinder latching projection 32 can be relatively displaced (can be relatively rotated) in the chamfer. The through hole 51 corresponds to the recessed part of the one-end part 50 in claims.

In the other-end part 52, a through hole 53 into which the inner cylinder latching projection 42 of the inner cylinder 4 is inserted is formed. The through hole 53 substantially forms a chamfer extending along the longitudinal direction of the link 5. The through hole 53 is formed such that the inserted inner cylinder latching projection 42 can be relatively displaced (can be relatively rotated) in the chamfer. The through hole 53 corresponds to the recessed part of the other-end part 52 in claims.

In the rotating support part 54, a through hole 55 into which the link support projection 26 of the cylinder part 22 is inserted is formed. The through hole 55 is formed to have a shape (inner circumferential shape substantially matched with the outer circumferential shape of the link support projection 26) in which the link 5 can be rotated about the inserted link support projection 26.

The link 5 has a spring latching projection 56 on which the other end of the spring member 6 is latched. In the first embodiment, the spring latching projection 56 is formed on the one-end part 50.

(Spring Member)

The spring member 6 corresponds to the spring-like member (biasing member) in claims.

The spring member 6 is, as shown in FIG. 1, a torsion spring. The link support projection 26 is inserted into a coil shaft of the spring member 6. One end of the spring member 6 is formed on the spring latching projection 27 of the body part 2, and the other end of the spring member 6 is formed on the spring latching projection 56 of the link 5.

(Other Configurations not Shown)

The cup holder 1 has a position holding part which holds the positions of the outer cylinder 3 and the inner cylinder 4, and a releasing part which release the held positions.

The position holding part is a part which holds the positions of the outer cylinder 3 and the inner cylinder 4 and is not limited to a specific configuration. More specifically, the position holding part is a part which holds the positions of the outer cylinder 3 and the inner cylinder 4 (especially, holds the axial position of the upper surface plate 41 of the inner cylinder 4 in contact with the bottom surface of the cup) in a state where the cup (drink) is held in the cup holder 1.

Figure 6:
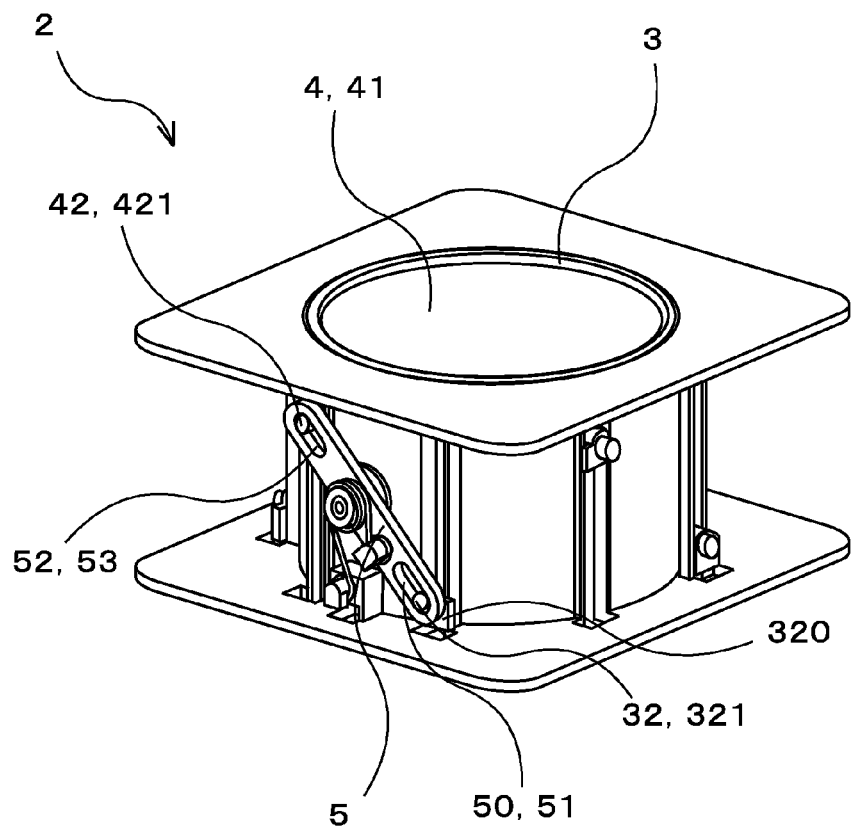
FIG. 6 is a perspective view of a stored state of the cup holder according to the first embodiment.

The releasing part is a part which releases the held position on the position holding part and is not limited to a specific configuration. When the releasing part releases the held position on the position holding part, biasing force of the spring member 6 holds the positions of the outer cylinder 3 and the inner cylinder 4 in use states (states shown in FIG. 6, which are a state in which the cup is held and a state in which the upper surface plate 41 is displaced on the lower end side).

(Assembly of Cup Holder)

In the assembly of the cup holder 1, the outer cylinder 3 and the inner cylinder 4 are inserted from the lower surface part 21 side of the body part 2 into the hollow portion at the axial center of the cylinder part 22.

In the state in which the outer cylinder 3 and the inner cylinder 4 are inserted, the outer cylinder 3 and the inner cylinder 4 can be displaced in the axial directions. The outer cylinder 3 and the inner cylinder 4 can be displaced (reciprocatingly moved) in the axial directions by the operations of the cut-away sections 24, 25, and 35 (flange parts 240 and 250) and the latching projections 32 and 42 without being twisted.

The directions in the phrases "through the opening in an outward direction of the receiving space" and the "through the opening in an inward direction of the receiving space" in claims correspond to a "direction from the lower end toward the upper end" and a "direction from the upper end toward the lower end" in the axial directions of the cup holder 1, respectively.

The link 5 is mounted such that the link support projection 26 of the cylinder part 22 is inserted into the through hole 55 of the link 5. At this time, the outer cylinder latching projection 32 (outer cylinder support part 321) of the outer cylinder 3 is inserted into the through hole 51 of the one-end part 50. The inner cylinder latching projection 42 (inner cylinder support part 421) of the inner cylinder 4 is inserted into the through hole 53 of the other-end part 52.

This state is a state in which the outer cylinder 3 and the inner cylinder 4 are connected to the one-end part 50 and the other-end part 52 of the link 5, respectively. In this state, the outer cylinder 3 and the inner cylinder 4 are connected to each other with the link 5, and the inner cylinder 4 and the outer cylinder 3 can be displaced in a conjunction manner in directions different from each other.

The spring member 6 is mounted. The spring member 6 is mounted in a state in which the link support projection 26 is inserted into the coil shaft. One end of the spring member 6 is mounted to be latched on the spring latching projection 27 of the body part 2, and the other end of the spring member 6 is mounted to be latched on the spring latching projection 56 of the link 5.

In this manner, the cup holder 1 according to the first embodiment is mounted.

(Operation of Cup Holder)

In the cup holder 1 according to the first embodiment, in the state immediately after the cup holder 1 is mounted, as shown in FIG. 1, the spring member 6 applies biasing force in a direction in which the spring latching projection 27 of the body part 2 and the spring latching projection 56 of the link 5 are separated from each other. This state is a state in which the outer cylinder 3 is maximally displaced on the upper end side and a state in which the inner cylinder 4 is maximally displaced on the lower end side. This state is a state in which the cup (drink) can be placed, and is defined as a use state.

The cup holder 1 in the use state, as shown in FIG. 1, the outer cylinder 3 protrudes from the upper surface part 20 of the body part 2, and the inner cylinder 4 sinks from the upper surface part 20. In this state, the inner circumferential surface of the outer cylinder 3, the upper surface plate 41 of the inner cylinder 4, and the inner circumferential surface of the cylinder part 22 of the body part 2 define a space (cup receiving space) in which the cup (drink) is placed.

The defined cup receiving space has an axial length which is a length from an end part of the upper end of the outer cylinder 3 to the upper surface plate 41 of the inner cylinder 4. This length is longer than the axial length of the cylinder part 22 of the body part 2. More specifically, the cup holder 1 according to the first embodiment can hold a cup having an axial length longer the axial length of the cup holder 1 itself.

In the cup holder 1 in the use state according to the first embodiment, the outer cylinder 3 can be stored in the cylinder part 22 of the body part 2 by being pressed into the cylinder part 22 (displaced on the lower end side in the axial direction).

When the outer cylinder 3 is pressed, the outer cylinder latching projection 32 of the outer cylinder 3 is simultaneously pressed and displaced.

More specifically, the outer cylinder latching projection 32 is in a state in which the outer cylinder latching projection body part 320 is inserted into the cut-away section 24 of the cylinder part 22, and the outer cylinder latching projection body part 320 is guided by the cut-away section 24 (flange part 240) and displaced toward the lower end in the axial direction without being twisted.

At this time, the outer cylinder support part 321 of the outer cylinder latching projection 32 is simultaneously displaced. The outer cylinder support part 321 is inserted into the through hole 51 of the one-end part 50 of the link 5, and the one-end part 50 of the link 5 is also displaced in accordance with the displacement of the outer cylinder latching projection 32.

The link 5 is supported such that the link 5 can be rotated about the through hole 55 of the rotating support part 54, and the other-end part 52 is also displaced in accordance with the displacement of the one-end part 50. The displacement of the other-end part 52 is rotation of the link 5, and becomes displacement of the one-end part 50 toward the lower end and displacement of the one-end part 50 toward the upper end (opposite direction).

When the outer cylinder 3 is completely pressed, the outer cylinder 3 is stored in a predetermined position inner than the upper surface part 20 of the cup holder 1. The inner cylinder 4 is displaced to the upper end and displaced to a position where the upper surface plate 41 substantially forms the same plane as that of the upper surface part 20 of the body part 2.

A position holding part (not shown) holds the positions of the outer cylinder 3 and the inner cylinder 4.

In this state, the inner cylinder 4 is displaced to the upper end and displaced to a position where the upper surface plate 41 substantially forms the same plane as that of the upper surface part 20 of the body part 2. This state is a state in which the cup (drink) cannot be placed, and is defined as a stored state.

In the cup holder 1 according to the first embodiment, in the stored state, it is possible to suppress the appearance from being deteriorated since a space serving as the cup receiving space is not exposed. Furthermore, in the cup holder 1 according to the first embodiment, in a state in which no cup is held, since the upper surface plate 41 forms a designed surface of the cup holder 1, the designability is also advantageously improved.

In the cup holder 1 according to the first embodiment, when the stored state is changed into the use state in order to hold the cup, the releasing part releases a held position on the position holding part.

When the held position is released, the outer cylinder 3 and the inner cylinder 4 are allowed to be displaced. The outer cylinder 3 and the inner cylinder 4 are connected to the link 5, and biasing force is applied to the link 5 by the spring member 6. The biasing force applied to the link 5 is force in a direction in which the cup holder 1 is in a use state. When the held position is released, displacement is performed such that the outer cylinder 3 is maximally displaced on the upper end side and the inner cylinder 4 is maximally displaced on the lower end side. More specifically, the cup holder 1 according to the first embodiment is in the use state.

(Effect of the First Embodiment)

As has been described above, in the cup holder 1 according to the first embodiment, the outer cylinder 3 and the inner cylinder 4 are connected to both the ends of the link 5, respectively, thereby making it possible to displace the outer cylinder 3 and the inner cylinder 4 in a conjunction manner in directions different from each other with a simple configuration.

When the outer cylinder 3 and the inner cylinder 4 are displaced in the directions different from each other to cause the outer cylinder 3 to protrude from the upper surface part 20, the axial length of the cup receiving space to be formed can be increased. More specifically, the cup holder 1 according to the first embodiment can hold a cup (or a plastic bottle) having a long axial length.

Furthermore, in the cup holder 1 according to the first embodiment, the spring member 6 applies biasing force to a position where the outer cylinder 3 and the inner cylinder 4 are in the use state. With the biasing force, the stored state of the cup holder 1 can be simply changed into the use state.

Second Embodiment

A cup holder 1 according to the second embodiment is the same as that of the first embodiment except for the link 5 (connection positions between the link 5 and the outer cylinder 3 and the inner cylinder 4). The link 5 according to the second embodiment is shown in FIG. 7.

Figure 7:
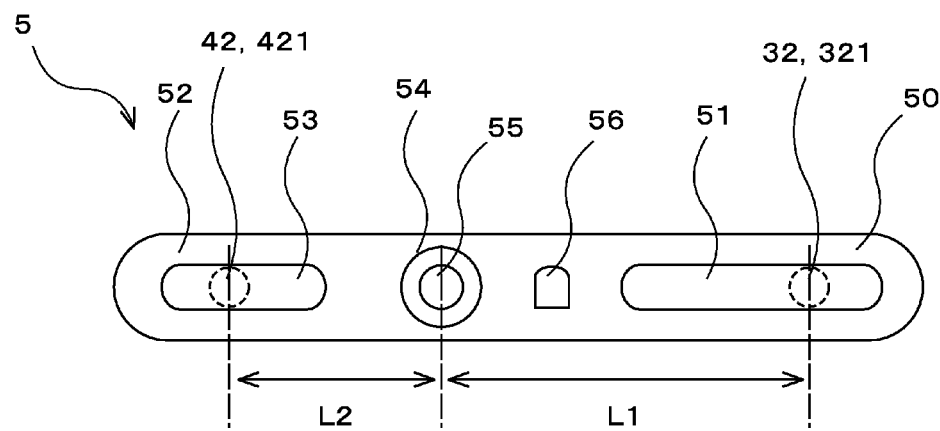
FIG. 7 is a front view of a link of a cup holder according to a second embodiment.

The link 5 according to the second embodiment, as shown in FIG. 7, a distance (L1) from the through hole 55 of the rotating support part 54 to the through hole 51 of the one-end part 50 is different from a distance (L2) from the through hole 55 to the through hole 53 of the other-end part 52. More specifically, the link 5 is formed such that the distance L1 is larger than the distance L2 (L1>L2).

The position of the through hole 55 of the rotating support part 54 serving as references of the lengths L1 and L2 is a center of rotation used when the link 5 is rotated. The position of the through hole 51 of the one-end part 50 is a position at the axial center of the outer cylinder support part 321 of the outer cylinder latching projection 32 inserted into the through hole 51. The position of the through hole 53 of the other-end part 52 is, similarly, a position at the axial center of the inner cylinder support part 421 of the inner cylinder latching projection 42 inserted into the through hole 53.

Figure 8:
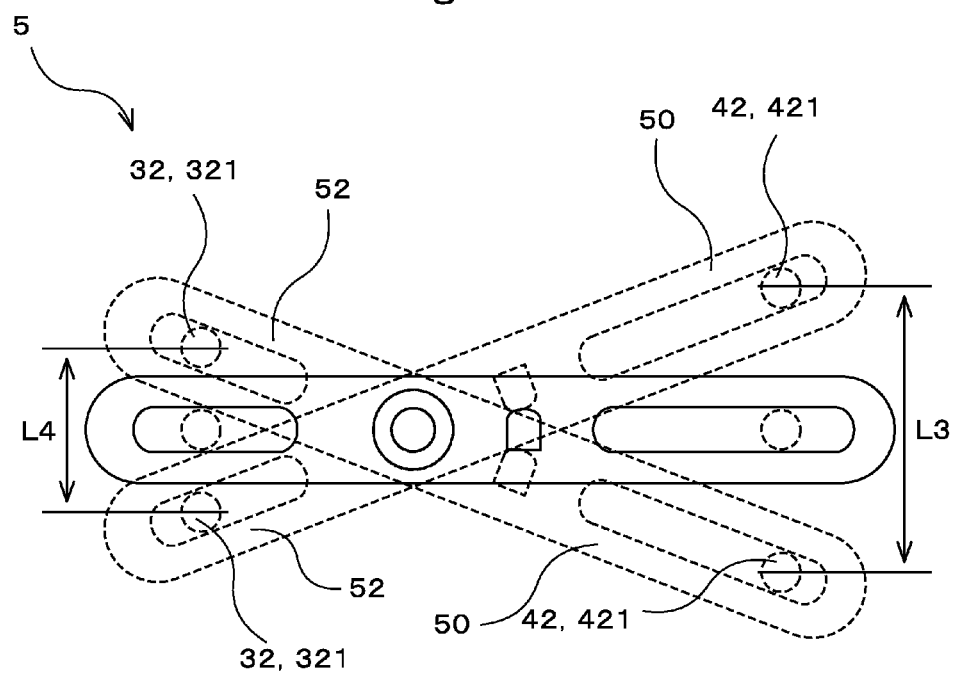
FIG. 8 is a schematic view showing movement of the link of the cup holder according to the second embodiment.

In the second embodiment, the link 5 is formed such that the length L1 is longer than the length L2, as shown in FIG. 8, thereby making it possible to make an amount of displacement (L3 in FIG. 8) of the outer cylinder 3 in the axial direction larger than an amount of displacement (L4 in FIG. 8) of the inner cylinder 4 in the axial direction. More specifically, an amount of protrusion of the outer cylinder 3 protruding from the upper surface part 20 can be more increased.

As a result, in the cup holder 1 according to the second embodiment, the length of the cup receiving space in the axial direction can be more increased.

First Modification

In the cup holder 1 according to the first and second embodiments, the spring member 6 applies biasing force to the link 5 such that the outer cylinder 3 and the inner cylinder 4 are in the use state. However, the biasing force may be applied to the link 5 such that the outer cylinder 3 and the inner cylinder 4 are in the stored state.

In this case, operations opposite to the above operations are performed.

Second Modification

Each of the first and second embodiments describes the example in which the number of link 5 or the like corresponding to the lifting part in claims is one. The link 5 or the like is preferably disposed at a plurality of positions. The links 5 or the like, which are disposed at the plurality of positions, suppress a deviation from the axial direction when the outer cylinder 3 and the inner cylinder 4 are displaced in the cylinder part 22 in the axial direction.

The lifting part is preferably disposed at a position symmetrical about the axial center of the cylinder part 22. The lifting parts are preferably disposed at two positions or three or more positions.

Third Modification

Each of the first and second modifications describes the example in which the spring member 6 corresponding to the biasing member in claims is a torsion spring. However, the spring member 6 is not limited to the torsion spring as long as the member exerts the same function as described above.

Third Embodiment

The cup holder 1 according to the third embodiment has configurations shown in FIG. 9 to FIG. 17.

Figure 9:
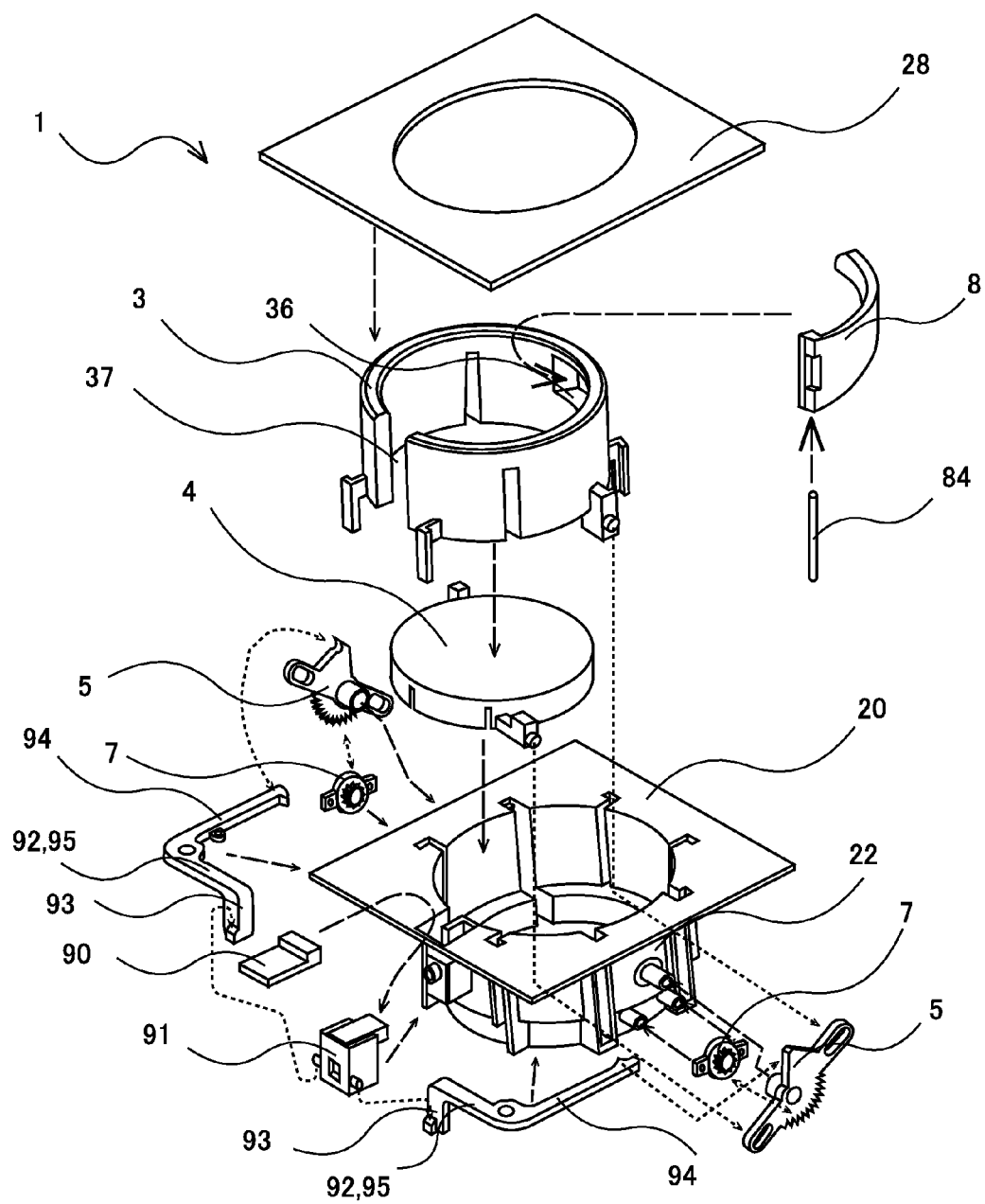
FIG. 9 is an exploded view of a cup holder according to a third embodiment.

The cup holder 1, as shown in the exploded view of FIG. 9, has the body part 2, the outer cylinder 3, the inner cylinder 4, the links 5,5, the spring member 6, a damper 7, a support 8, and a switch 9. In the cup holder 1 according to the third embodiment, the same reference numerals as in the first and second embodiments denote the members having the same functions as in the first and second embodiments. The configurations which are not particularly referred to are the same as those in each of the first and second embodiments, and a description thereof will not be made.

(Body Part)

Figure 10:
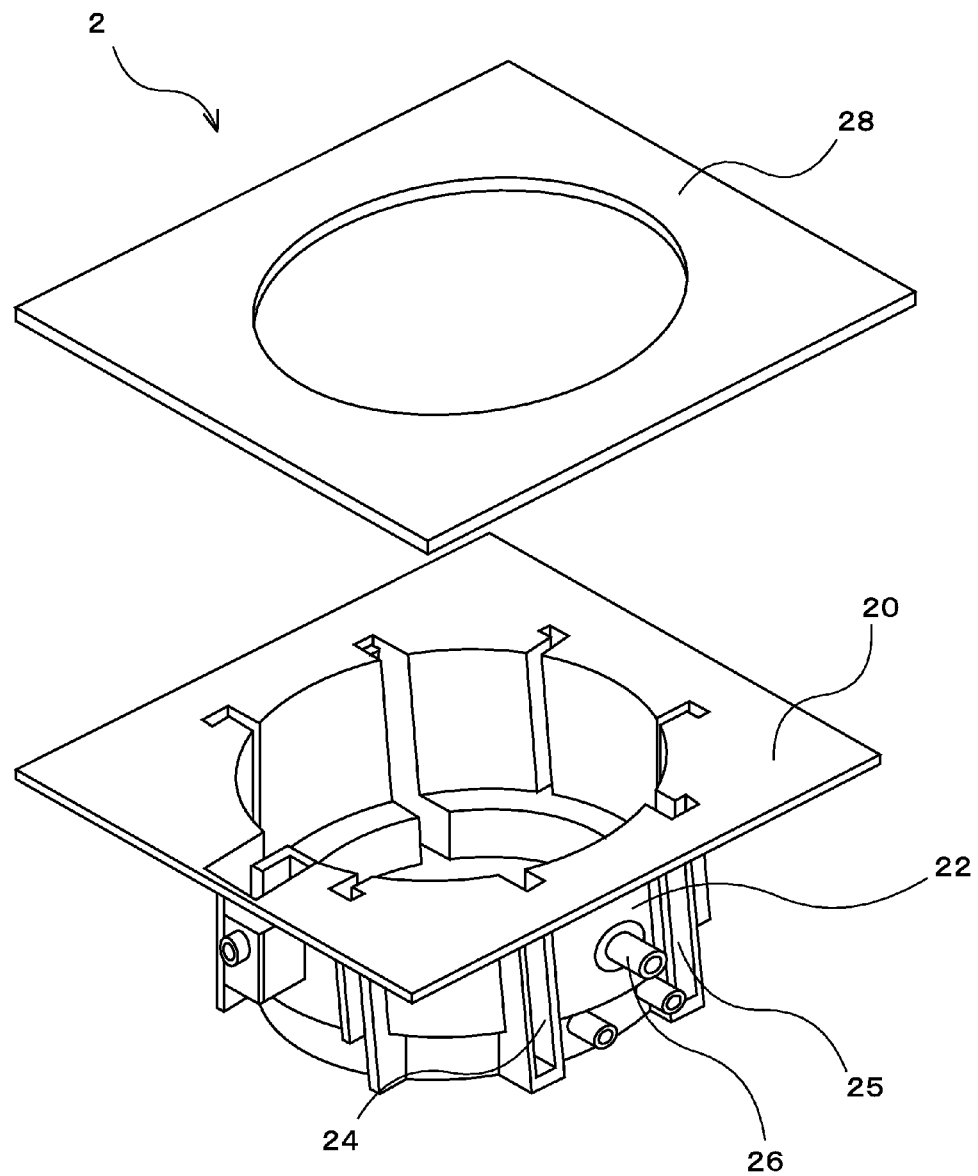
FIG. 10 is a perspective view of an outer cylinder of the cup holder according to the third embodiment.
Figure 11:
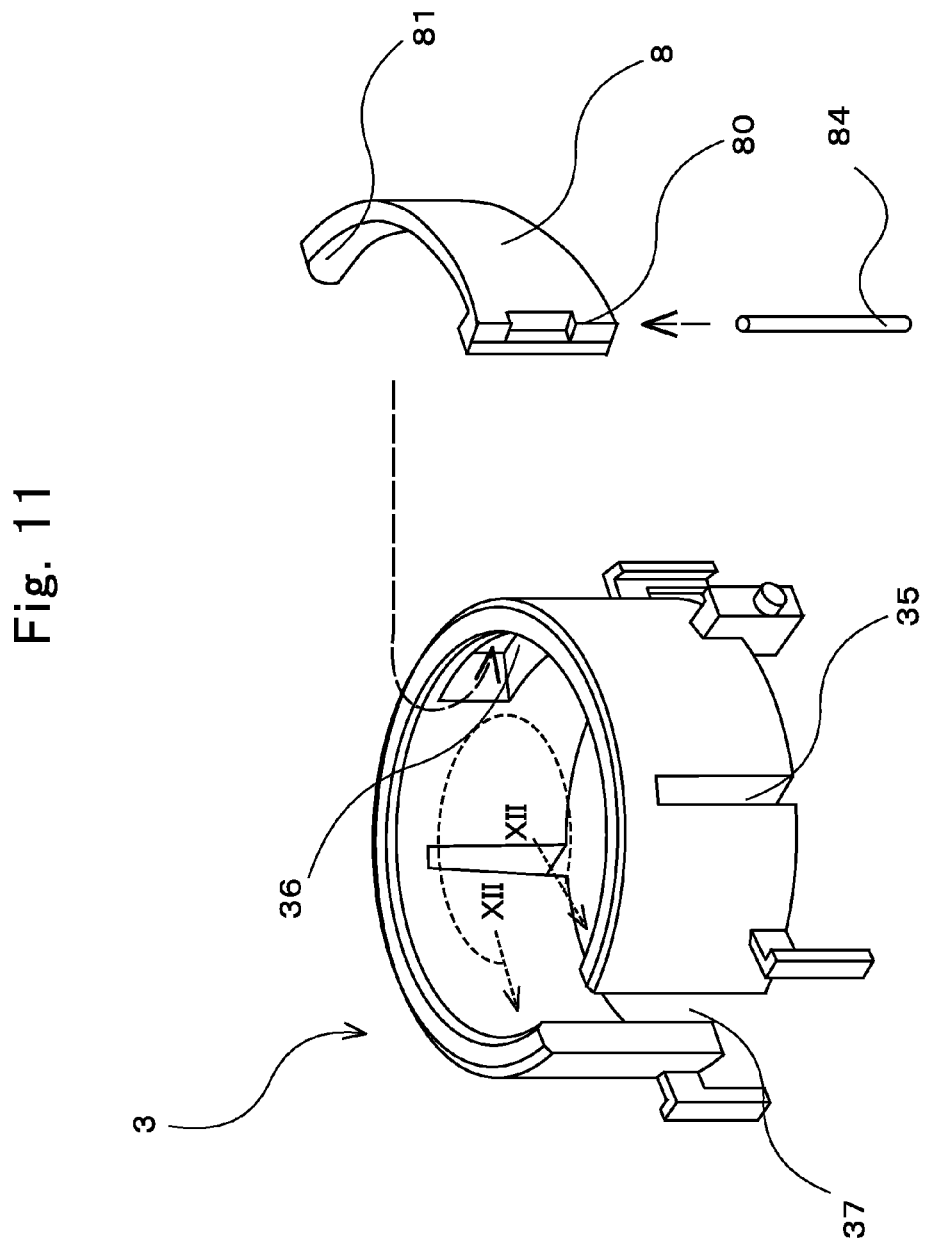
FIG. 11 is a perspective view of the outer cylinder of the cup holder according to the third embodiment.

The body part 2, as shown in FIG. 10, has the upper surface part 20 and the cylinder part 22. The cylinder part 22 defines a receiving space therein and has an opening which defines a communication hole for causing the receiving space and the outside to communicate with each other.

The body part 2 is mounted above the upper surface part 20, and further has a surface plate 28 which forms the designed surface of the cup holder 1.

The surface plate 28 forms the designed surface of the cup holder 1 according to the third embodiment. The surface plate 28 is fixed to the upper surface part 20. The fixing method is not limited to a specific method, and the surface plate 28 is preferably detachably engaged with the upper surface part 20.

The upper surface part 20 functions in the same manner as that in the first embodiment except that the designed surface on the upper surface of the cup holder 1 is not formed.

The cylinder part 22 has the same configuration and functions in the same manner as the cylinder part 22 of the first embodiment.

In the third embodiment, the other-end part (lower end) of the cylinder part 22 is the other-end part (lower end) of the cup holder 1. On the other-end part (lower end) of the cylinder part 22, a plate-like lower surface part may be formed in the same manner as that in the first embodiment.

(Outer Cylinder)

Figure 12:
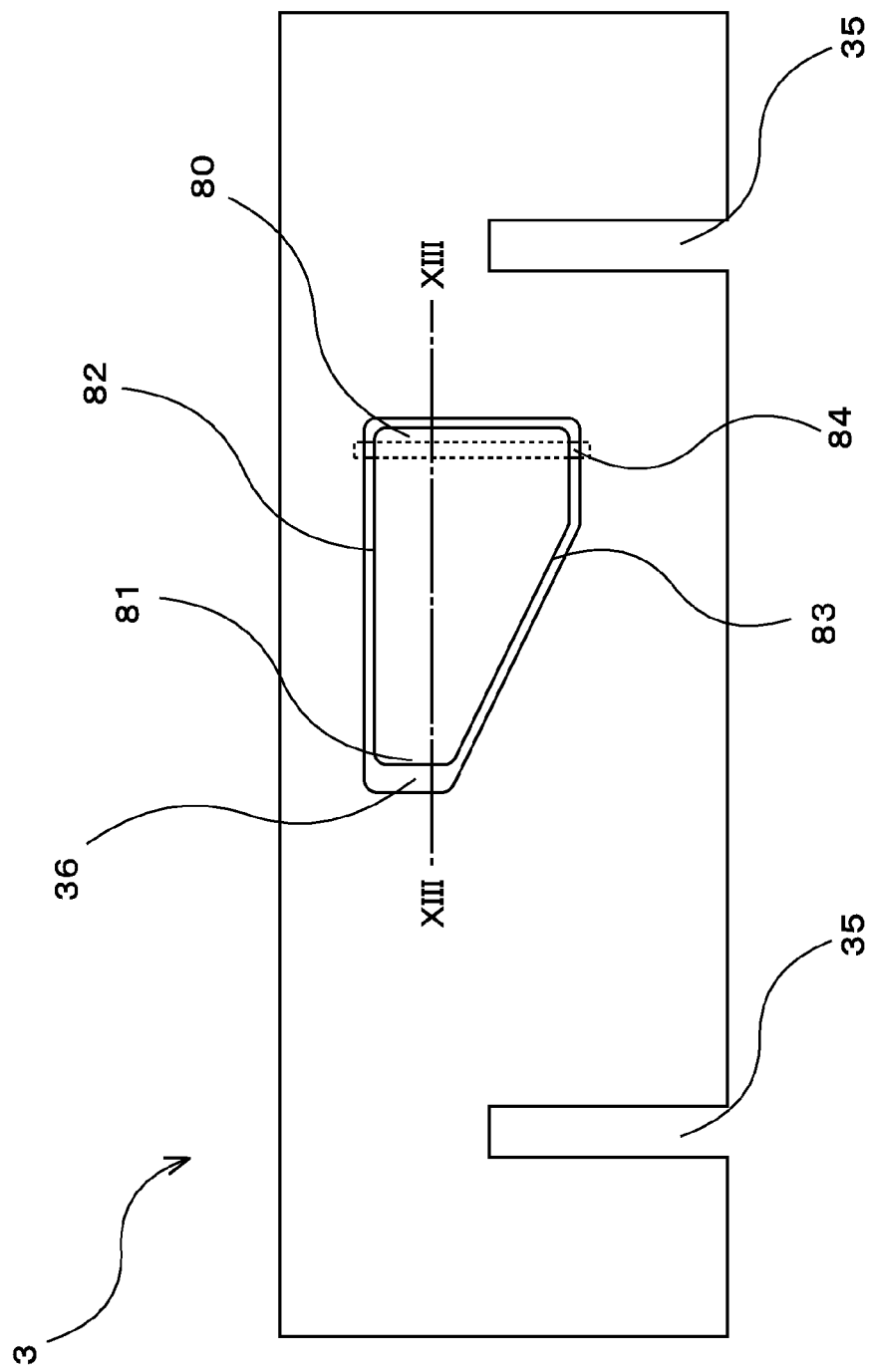
FIG. 12 is a development view of an inner circumferential surface of the outer cylinder of the cup holder according to the third embodiment.

The outer cylinder 3 has the same configuration and functions in the same manner as that in the outer cylinder 3 of the first embodiment. The outer cylinder 3 is shown in the perspective view of FIG. 11, and a development view (visual check on an XII-XII line in FIG. 11) of the inner circumferential surface is shown in FIG. 12. The outer cylinder 3 according to the third embodiment has an annular shape which is partially cut with a cut-away section 37. In the third embodiment, the outer cylinder 3 has the cut-away section 37, but may have the same continuous annular shape as that in the first embodiment.

On the cut-away section 37 of the outer cylinder 3, the switch 9 (pressure plate 90) is disposed.

The outer cylinder 3, as shown in FIG. 12, has a support receiving part 36 which swingably receives the support 8 on the inner circumferential surface of the outer cylinder 3.

Figure 13:
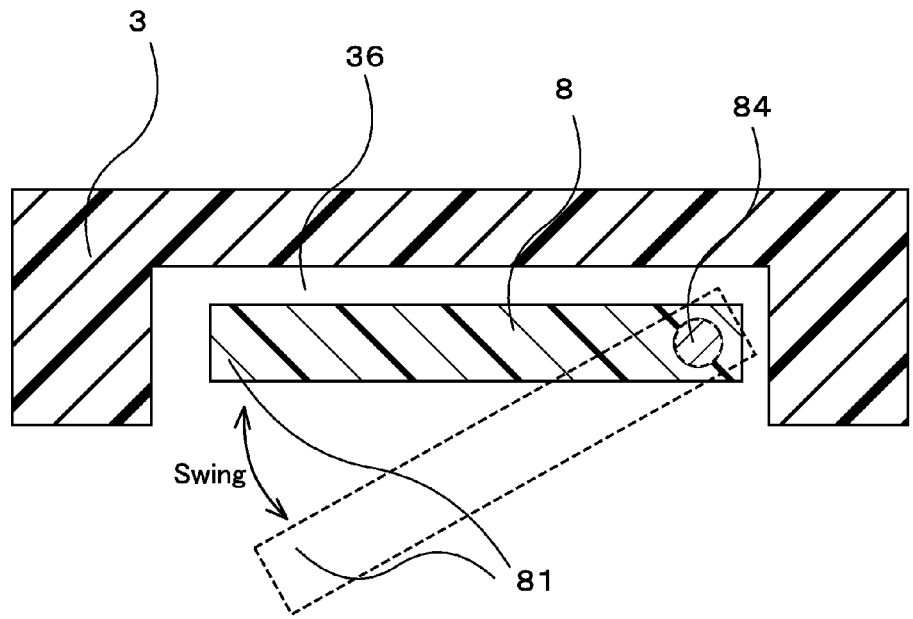
FIG. 13 is a partial sectional view of the outer cylinder of the cup holder according to the third embodiment.
Figure 14:
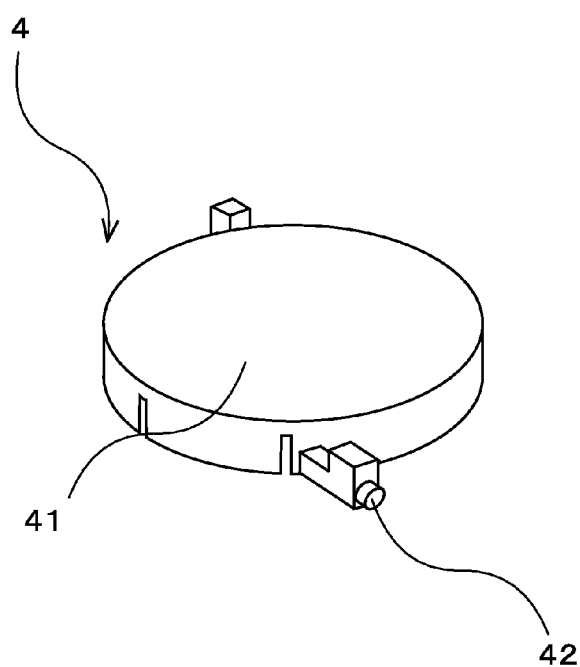
FIG. 14 is a perspective view of an inner cylinder of the cup holder according to the third embodiment.

The support receiving part 36 may be formed to cause the outside and the inside of the cylindrical outer cylinder 3 to radially communicate with each other, or the support receiving part 36 may be formed to have a recessed part in the inner circumferential surface as shown in the sectional shape in FIG. 13. The support receiving part 36 preferably has the form the sectional view of which is shown in FIG. 13. FIG. 13 is a sectional view (development view) along an XIII-XIII line in FIG. 12.

(Support)

The support 8 is, as shown in FIGS. 12 and 13, a member (substantially curved-plate-like member) curved along a curved shape of the outer cylinder 3 in the circumferential direction. The support 8 has a tapered shape having a wide proximal end 80 and a narrow distal end 81. The support 8 is formed such that an axial one-end part (upper end) 82 overlaps a plane perpendicular to the axial direction when the support 8 is mounted in the outer cylinder 3, and an other-end part (lower end) 83 has a tapered shape inclined with respect to the upper end 82. The other-end part (lower end) 83 of the support 8 is formed to have a spiral shape with respect to the outer cylinder 3.

The support 8 is supported with a spring 84 such that the proximal end 80 is in the support receiving part 36 of the outer cylinder 3 and the distal end 81 can be swung. The proximal end 80 has a through hole (not shown) formed therein, and the spring 84 is inserted into the through hole. Both the ends of the spring 84 are supported and fixed inside the support receiving part 36 of the outer cylinder 3. The support 8 is supported such that the distal end 81 is biased in the axial direction. When the support 8 receives stress oriented toward the radial outside, the distal end 81 is swung toward the radial outside and received in the support receiving part 36.

When the other-end part (lower end) 83 in the axial direction is brought into contact with the inner cylinder 4, the support 8 is guided toward the support receiving part 36 and received in the support receiving part 36.

In the third embodiment, one support 8 is used, but two or more supports 8 may be used.

(Inner Cylinder)

The inner cylinder 4 has the same configuration and functions in the same manner as that in the inner cylinder 4 of the first embodiment. The inner cylinder 4 is shown in a perspective view of FIG. 14.

(Link)

Figure 15:
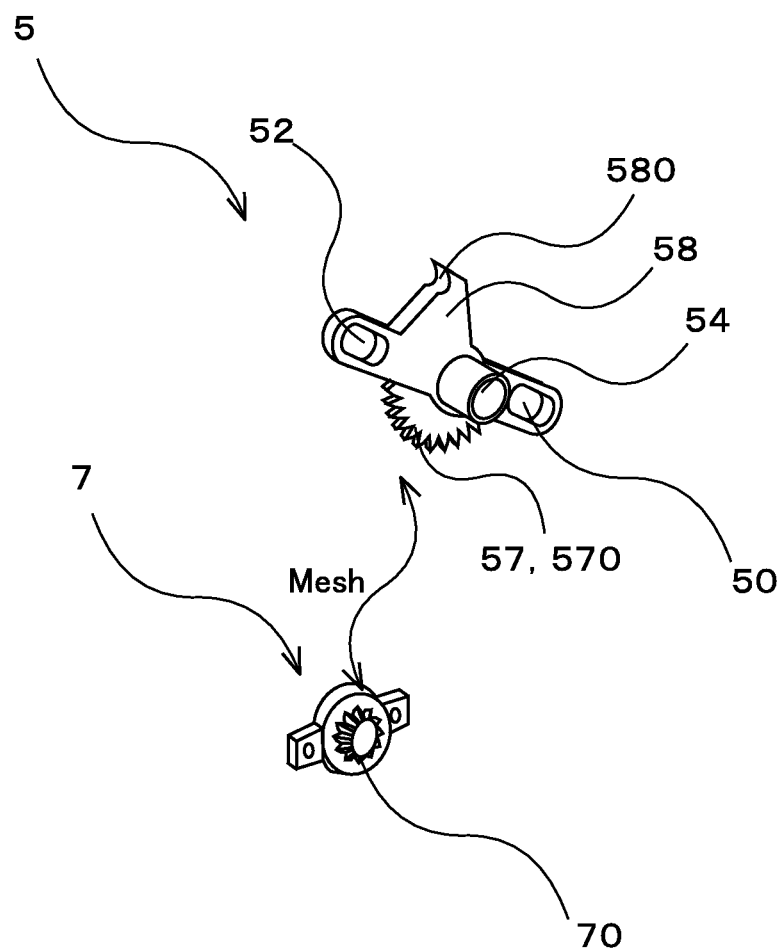
FIG. 15 is a perspective view showing a configuration of a link of the cup holder according to the third embodiment.

The link 5 is, as shown in FIG. 15, a plate-like member. The link 5 includes the one-end part 50, the other-end part 52, the rotating support part 54, a gear part 57, and a latching claw part 58. The link 5 according to the third embodiment also has a spring latching projection (not shown) as in each of the first and second embodiments.

The gear part 57 is a substantially semicircular part formed to project from the other-end part of the rotating support part 54 of the link 5 in a direction of width. A gear 570 is formed on a semicircular outer circumferential surface of the gear part 57. The gear 570 is meshed with a gear 70 of the damper 7 to buffer the rotating speed of the link 5.

The latching claw part 58 is a part formed on the one-end part of the rotating support part 54 of the link 5 in the direction of width. The latching claw part 58 has a latching claw 580 formed at a protruding distal end part thereof. The latching claw 580 of the latching claw part 58 is latched on a latching claw 940 of the switch 9 to regulate rotation (displacement) of the link 5.

Figure 16:
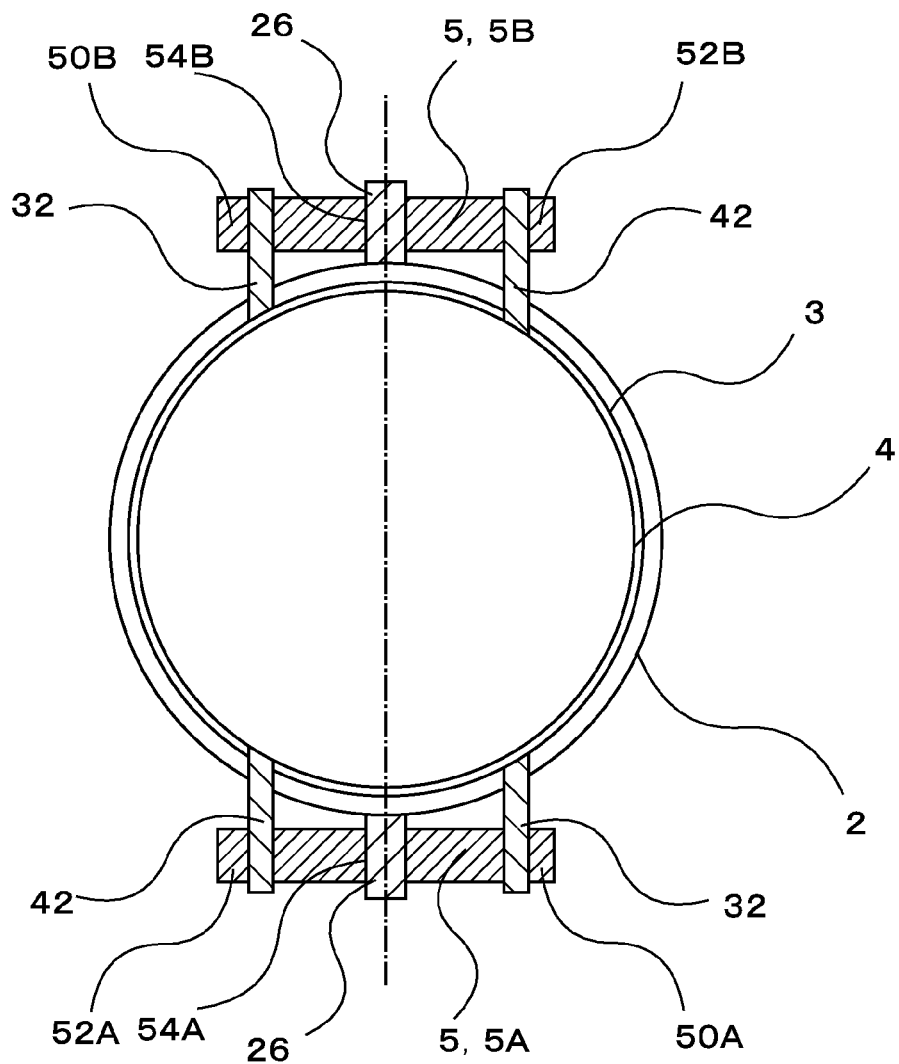
FIG. 16 is a top view showing an arrangement of the link of the cup holder according to the third embodiment.
Figure 17:
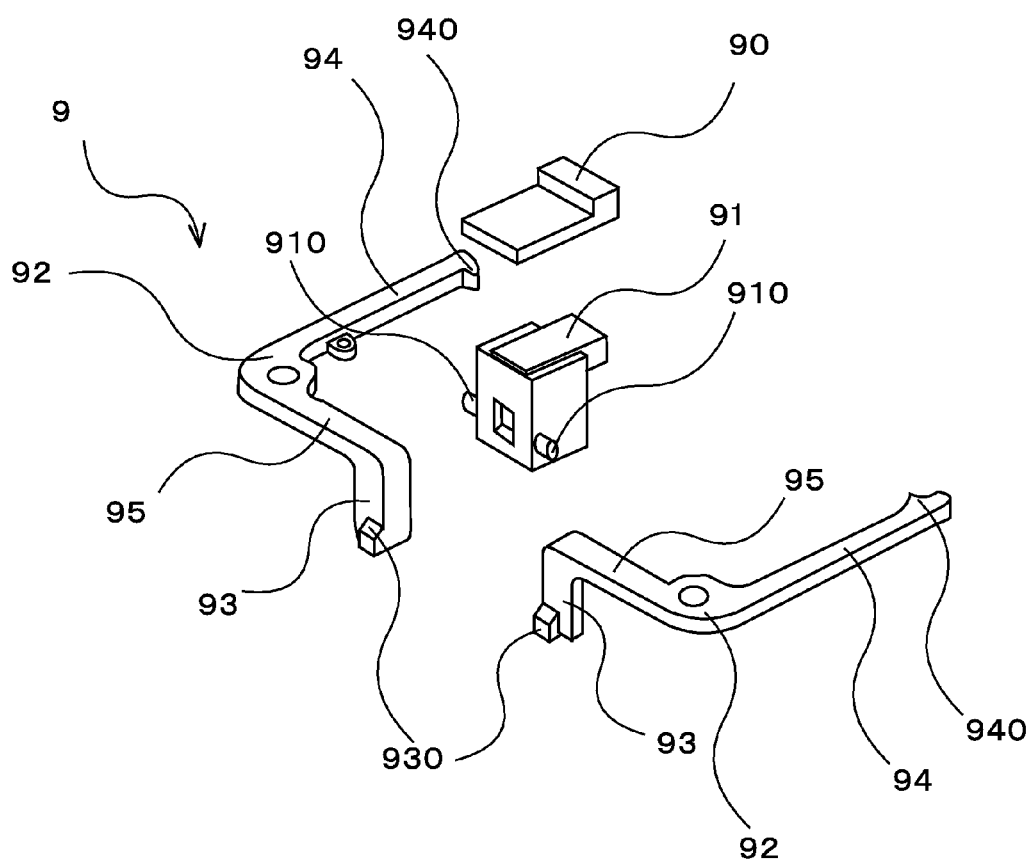
FIG. 17 is a perspective view showing a configuration of a switch of the cup holder according to the third embodiment.

The cup holder 1 according to the third embodiment has two links 5A and 5B disposed at symmetrical positions in the circumferential direction (symmetrical positions at 180 degrees). The two links 5A and 5B, as shown in a schematic view of FIG. 16, are disposed such that a direction from the one-end part 50 (50A and 50B) toward the other-end part 52 (52A and 52B) is matched with the circumferential direction.

(Switch)

The switch 9 corresponds to the releasing part and the position holding part according to the first embodiment. The switch 9 includes, as shown in an exploded view of FIG. 17, the pressure plate 90, a button body part 91, and a link part 92.

The pressure plate 90 has a plate-like shape. An end part on an inner diameter and a portion adjacent thereto are exposed at a discontinuous annular part at the one-end part of the outer cylinder 3.

The button body part 91 is a substantially box-like member disposed on the lower surface of the pressure plate 90, and has projections 910, 910 protruding from the side surface (side surface parallel with the radial outside of the body part 2) of the pressure plate 90. The button body part 91 is disposed such that the button body part 91 can be reciprocatingly moved in the axial directions (vertical directions). When the pressure plate 90 is pressed, the button body part 91 is displaced downward.

The link part 92 connects the projection 910 and the latching claw 580 to each other. In the third embodiment, the two link parts 92 having symmetrical shapes are used.

The link part 92 has a one-end part 93 guided by the projection 910. The one-end part 93 extends along the axial direction and has a guide projection 930 brought into contact with the projection 910 at the distal end part of the one-end part 93. The guide projection 930 is brought into contact with the projection 910, and displacement of the one-end part 93 toward the cylinder part 22 of the body part 2 in accordance with the displacement of the projection 910 is guided. In the third embodiment, the guide projection 930 is formed such that an upper surface which is brought into contact (slidably contact) with the projection 910 is inclined in a direction in which the projection 910 is displaced. The contact surface is inclined to guide the one-end part 93 in a direction in which the one-end part 93 gets close to the cylinder part 22 of the body part 2.

An other-end part 94 of the link part 92 has the latching claw 940, which is configured to be latched on the latching claw 580, at the distal end of the other-end part 94.

The one-end part 93 and the other-end part 94 of the link part 92 are connected to each other by a link body part 95. The other-end part 94 and the link body part 95 are disposed in the form of an L shape along the outer circumference of the upper surface part 20 of the body part 2. The other-end part 94 and the link body part 95 are pivotally supported by a crossing portion (corner portion of the L shape) therebetween.

When the pressure plate 90 is pressed, the switch 9 displaces the button body part 91 downward. At this time, the guide projection 930 is displaced along the surface of the projection 910 of the button body part 91, and the one-end part 93 of the link part 92 is displaced in a direction in which the one-end part 93 gets close to the cylinder part 22 of the body part 2. In this manner, the link body part 95 swings with respect to the axis, and the other-end part 94 is also displaced (swung) in a direction in which the latching claw 940 is separated from the cylinder part 22 of the body part 2. As a result, the latching claw 580 and the latching claw 940 engaged therewith are disengaged, the link 5 rotates, the positions of the outer cylinder 3 and the inner cylinder 4 are displaced to a use state (state in which the cup can be held, and state in which the upper surface plate 41 is displaced to the lower end side) and held.

(Operation and Advantage of Cup Holder)

In the cup holder 1 according to the third embodiment, as described above, when the pressure plate 90 of the switch 9 is pressed (pressed downward), the link 5 operates as in the first embodiment. The outer cylinder 3 is displaced to the uppermost end side, and the inner cylinder 4 is displaced to the lowermost end side, so that the cup holder 1 is set in a use state (state in which a cup can be held).

In the third embodiment, the two links 5A and 5B are disposed to have the same orientation along the circumferential direction. More specifically, a line (virtual line or one-point broken line in FIG. 16) connecting rotating support parts 54A and 54B of the two links 5A and 5B passes through the axial center (central axis). As shown in a top view as a schematic view of FIG. 16, on one side divided by the virtual line, the one-end part 50A of one link 5A and an other-end part 52B of the other link 50B are located. On the other side divided by the virtual line, the other-end part 52A of one link 5A and the one-end part 50B of the other link 5B are located.

Figure 18:
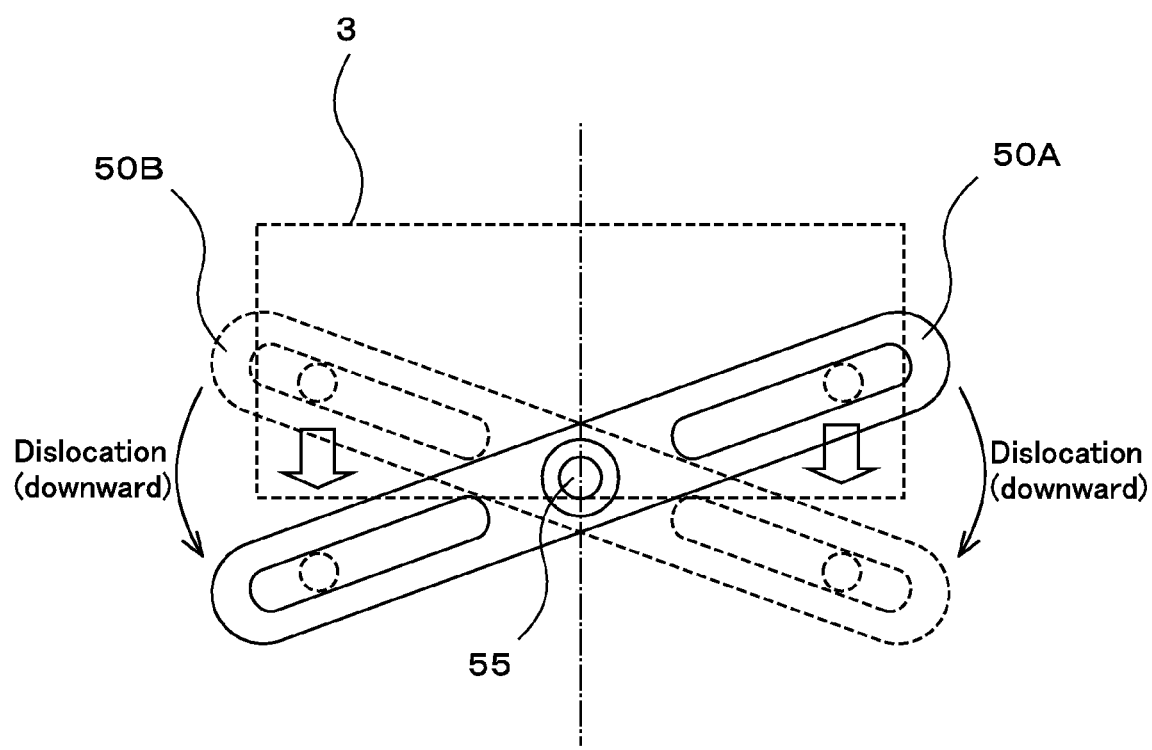
FIG. 18 is a schematic view showing movement of the link of the cup holder according to the third embodiment.

In this configuration, as shown in the schematic view of FIG. 18, even though the one-end parts 50A and 50B are displaced in the same direction (displaced downward in FIG. 18), the one-end parts 50A and 50B are not located on the same side divided by the virtual line. For this reason, the same force acts on both the sides of the virtual line, and the one-end parts 50A and 50B are displaced by the same amount of displacement. More specifically, as shown in FIG. 18 schematically showing the displacement of the outer cylinder 3, the same amounts of displacements are obtained on both the sides of the virtual line, and the outer cylinder 3 is displaced (downward) without being inclined.

As described above, in the cup holder 1 according to the third embodiment, the outer cylinder 3 and the inner cylinder 4 are smoothly displaced along the axial direction without being inclined. More specifically, in the cup holder 1 according to the third embodiment, the outer cylinder 3 and the inner cylinder 4 can be smoothly displaced.

Furthermore, when the cup holder 1 according to the third embodiment is in the use state, the axial positions of the outer cylinder 3 and the inner cylinder 4 do not overlap. In this case, the support 8 is held in a state in which the distal end 81 is displaced toward the axial center part. When a cup is inserted, the support 8 is retracted (displaced) in the inward direction of the support receiving part 36. In this state, the support 8 biases the cup in the opposite direction to suppress the cup from being deviated.

When the outer cylinder 3 is pressed without a cup, the cup holder 1 is set in a stored state. The operations of the outer cylinder 3 and the inner cylinder 4 at this time are the same as those in the first and second embodiments.

In the third embodiment, when the outer cylinder 3 is pressed and displaced in the axial direction, the axial position of the inner cylinder 4 is also displaced with the link 5. At this time, the upper end face of the inner cylinder 4 is brought into contact with the other-end part (lower end) 83 of the support 8. The other-end part (lower end) 83 of the support 8 is formed to be inclined, and the inclined surface functions as a guide. As a result, the support 8 is retracted (displaced) in the inward direction of the support receiving part 36 and received therein.

As described above, the cup holder 1 according to the third embodiment exerts an effect in which the support 8 for supporting a cup can be disposed without disposing a special mechanism.

What is claimed is:

1. A liftable container holder comprising:
   a case part that defines a receiving space therein and has an opening of the receiving space, wherein a link support projection protrudes from an outer surface of the case part;
   an outer cylinder part that is disposed in the receiving space and is movable in a reciprocating manner through the opening in an outward direction of the receiving space, wherein an outer cylinder latching projection is formed on an outer surface of the outer cylinder part;
   an inner cylinder part that is disposed in the receiving space and is movable in a reciprocating manner through the opening in an inward direction of the receiving space, wherein an inner cylinder latching projection is formed on an outer surface of the inner cylinder part; and
   a link member that displaces the inner cylinder part and the outer cylinder part in directions different from each other, wherein
   the link member includes a first end part connected to the outer cylinder-latching projection, a second end part connected to the inner cylinder latching projection, and a rotating support part rotatably supported on the case part by the link support projection between the first end part and the second end part, and
   the link member has a biasing member that biases the inner cylinder part in one of the inward direction and the outward direction of the receiving space and biases the outer cylinder part in the other of the inward direction and the outward direction of the receiving space.

2. The liftable container holder according to claim 1, wherein the biasing member is a spring member that applies biasing force to the link member.

3. The liftable container holder according to claim 2, wherein the first end part and the second end part are connected to each other such that the outer cylinder part and the inner cylinder part are movable in a reciprocating manner.

4. The liftable container holder according to 2, wherein the first end part and the second end part have recessed parts, and
   the outer cylinder part and the inner cylinder part have projections having distal ends inserted into the recessed parts, respectively.

5. The liftable container holder according to claim 2, wherein a distance between the rotating support part and the first end part is different from a distance between the rotating support part and the second end part.

6. The liftable container holder according to claim 2, wherein
   the outer cylinder part is a cylindrical member, and
   the inner cylinder part has an upper surface plate that is moved in a reciprocating manner in a central part of the outer cylinder part and functions as a bottom wall.

7. The liftable container holder according to claim 2, wherein an upper surface plate of the inner cylinder part serves as a lid member that closes the inner cylinder part.

8. The liftable container holder according to claim 2, wherein
   the link member is a first link member, and the liftable container holder includes a second link member that has a first end part and a second end part;
   the two link members are disposed symmetrically about a central axis of the outer cylinder part, and
   the first end parts of the link members are disposed to have the same orientation along a circumferential direction of the liftable container holder.

9. The liftable container holder according to claim 1, wherein the first end part and the second end part are connected to each other such that the outer cylinder part and the inner cylinder part are movable in a reciprocating manner.

10. The liftable container holder according to claim 1, wherein
the first end part and the second end part have recessed parts, and
the outer cylinder part and the inner cylinder part have projections having distal ends inserted into the recessed parts, respectively.

11. The liftable container holder according to claim 1, wherein a distance between the rotating support part and the first end part is different from a distance between the rotating support part and the second end part.

12. The liftable container holder according to claim 1, wherein
the outer cylinder part is a cylindrical member, and
the inner cylinder part has an upper surface plate that is moved in a reciprocating manner in a central part of the outer cylinder part and functions as a bottom wall.

13. The liftable container holder according to claim 1, wherein an upper surface plate of the inner cylinder part serves as a lid member that closes inner cylinder part.

14. The liftable container holder according to claim 1, wherein
the link member is a first link member, and the liftable container holder includes a second link member that has a first end part and a second end part;
the two link members are disposed symmetrically about a central axis of the outer cylinder part, and
the first end parts of the link members are disposed to have the same orientation along a circumferential direction of the liftable container holder.

15. A liftable container holder comprising:
a case part that defines a receiving space therein and has an opening of the receiving space, wherein a link support projection protrudes from an outer surface of the case part;
an outer cylinder part that is disposed in the receiving space and is movable in a reciprocating manner through the opening in an outward direction of the receiving space, wherein an outer cylinder latching projection is formed on an outer surface of the outer cylinder part;
an inner cylinder part that is disposed in the receiving space and is movable in a reciprocating manner through the opening in an inward direction of the receiving space, wherein an inner cylinder latching projection is formed on an outer surface of the inner cylinder part; and
a link member that displaces the inner cylinder part and the outer cylinder part in directions different from each other, wherein
the link member includes a first end part connected to the outer cylinder-latching projection, a second end part connected to the inner cylinder latching projection, and a rotating support part rotatably supported on the case part by the link support projection between the first end part and the second end part, and
the inner cylinder latching projection extends through openings formed in the outer cylinder part and the case part, and the outer cylinder latching projection extends through an opening formed in the case part, so that both the inner cylinder latching projection and the outer cylinder latching projection are located on an external surface of the case part.

16. The liftable container holder according to claim 15, wherein the first end part and the second end part are connected to each other such that the outer cylinder part and the inner cylinder part are movable in a reciprocating manner.

17. The liftable container holder according to 15, wherein
the first end part and the second end part have recessed parts, and
the outer cylinder part and the inner cylinder part have projections having distal ends inserted into the recessed parts, respectively.

18. The liftable container holder according to claim 15, wherein a distance between the rotating support part and the first end part is different from a distance between the rotating support part and the second end part.

19. The liftable container holder according to claim 15, wherein
the outer cylinder part is a cylindrical member, and
the inner cylinder part has an upper surface plate that is moved in a reciprocating manner in a central part of the outer cylinder part and functions as a bottom wall.

20. The liftable container holder according to claim 15, wherein an upper surface plate of the inner cylinder part serves as a lid member that closes the inner cylinder part.

21. The liftable container holder according to claim 15, wherein
the link member is a first link member, and the liftable container holder includes a second link member that has a first end part and a second end part;
the two link members are disposed symmetrically about a central axis of the outer cylinder part, and
the first end parts of the link members are disposed to have the same orientation along a circumferential direction of the liftable container holder.

\* \* \* \* \*